Sept. 3, 1929.  S. J. ROUSEY  1,727,038
LEAK STOP FOR USE WITH PIPES
Filed Feb. 28, 1928
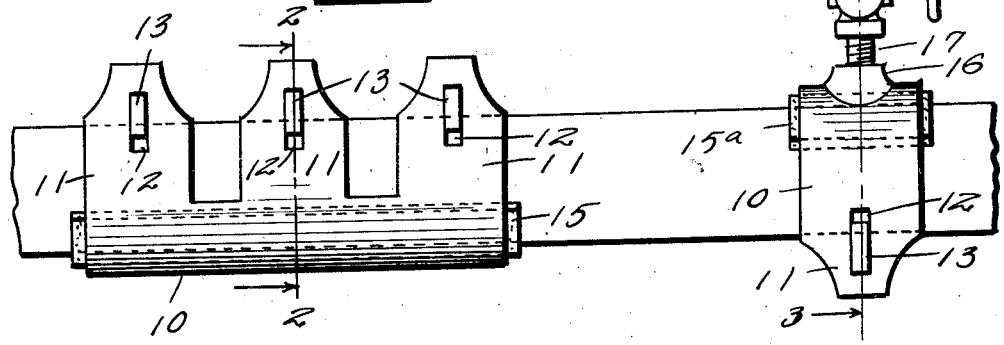
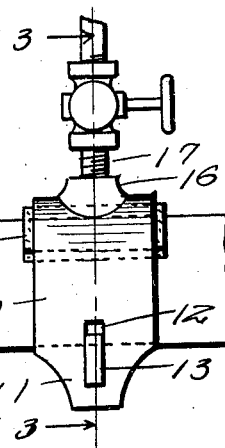
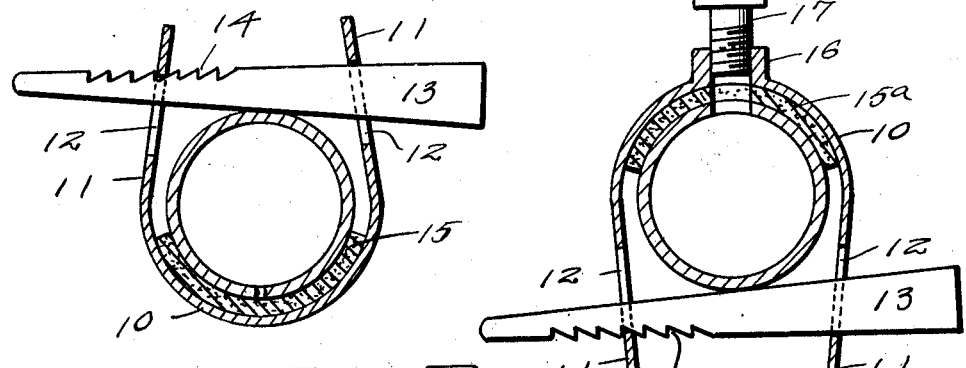
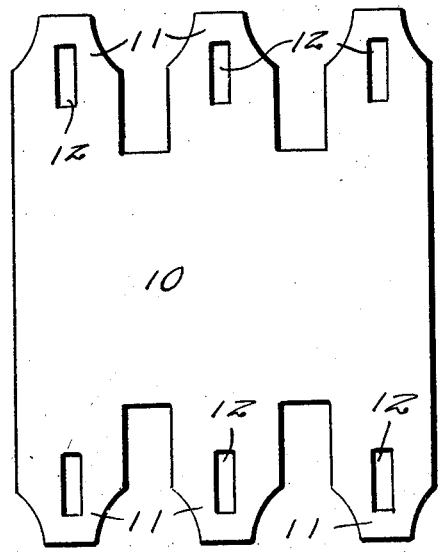
Inventor
S. J. Rousey
By Watson E. Coleman
Attorney Patented Sept. 3, 1929.

1,727,038

UNITED STATES PATENT OFFICE.

SAMUEL J. ROUSEY, OF LAWRENCEVILLE, ILLINOIS.

LEAK STOP FOR USE WITH PIPES.

Application filed February 28, 1928. Serial No. 257,649.

This invention relates to a leak stop for use with pipes and more particularly to an emergency patch for sealing a leak in a steam, water or gas main.

An important object of the invention is to provide a device of this character which may be rapidly and easily applied to the pipe and which will provide an efficient seal for a considerable period.

A further object of the invention is to provide a device of this character which may be employed in making emergency or temporary connections with a pipe.

These and other objects I attain by the construction shown in the accompanying drawing, wherein for the purpose of illustration is shown a preferred embodiment of my invention and wherein:—

Figure 1 is a side elevation of a pipe having applied thereto leak stops constructed in accordance with my invention;

Figure 2 is a section on the line 2—2 of Figure 1;

Figure 3 is a section on the line 3—3 of Figure 1;

Figure 4 is a plan view of the blank from which one of the saddles is formed.

Referring now more particularly to the drawing, the leak stop comprises a saddle 10 shaped to conform to the shaping of the pipe with which it is to coact and having at each side thereof one or more stirrups 11 having openings 12 formed therein. These openings have their inner edges spaced from the inner face of the saddle a distance slightly less than the diameter of the pipe with which the device is to be employed. The stirrups 12 are arranged in opposed pairs and with each pair is associated a wedge 13 having at its smaller end ratchet teeth 14.

In the use of the device, a packing sheet 15 is inserted between the saddle and the pipe and placed over the leak. The wedges 13 are then inserted and driven home until this packing is so tightly forced into engagement with the pipe by the saddle that leakage is checked.

In some instances, it is desirable that an emergency tap be made in a main. To this end, the saddle may be provided with a boss 16 in which is engaged one end of a valved conduit 17 which may be connected to any delivery point by further conduits (not herein disclosed). Employing an apparatus of this character, an opening can be formed in the conduit to be tapped and the saddle placed thereover the packing sheet 15ª being first formed with an opening 18 to coincide with the opening of the conduit. This will permit tapping where the formation of threads in the opening of the conduit would be impossible without interrupting service through the conduit as, for example on a service steam or gas main.

Since the construction hereinbefore set forth is capable of a certain range of change and modification without materially departing from the spirit of the invention, I do not limit myself to such specific structure except as hereinafter claimed.

I claim:—

A leak stop for conduits comprising a saddle adapted to seat upon thec onduit at the leak and having stirrups extending to the opposite side of the conduit, said stirrups having openings the inner ends of which are spaced from the inner face of the saddle a distance less than the diameter of the conduit, and a wedge for insertion through said openings and adapted to directly engage the opposite face of the conduit from the saddle, said wedge at its smaller end having ratchet teeth for coaction with one of the stirrups.

In testimony whereof I hereunto affix my signature.

SAMUEL J. ROUSEY.